US005471519A

United States Patent [19]
Howe et al.

[11] Patent Number: 5,471,519
[45] Date of Patent: Nov. 28, 1995

[54] COMMUNICATIONS MONITORING AND CONTROL SYSTEM

[75] Inventors: Wayne Howe, Duluth; Ed Silver, Atlanta; Kim Bailey, Newnan; Jerry Shih, Roswell; Kitty Morel, Dunwoody; Peter Hill; Cathy Addison, both of Atlanta; Larry Woodring, Decatur; Dale Malik, Dunwoody, all of Ga.

[73] Assignee: BellSouth Corporation, Atlanta, Ga.

[21] Appl. No.: 25,370

[22] Filed: Feb. 26, 1993

[51] Int. Cl.$^6$ .................................................. H04M 3/22
[52] U.S. Cl. .......................... 379/67; 379/88; 379/89; 379/34; 379/35; 379/221
[58] Field of Search ........................... 379/67, 201, 202, 379/203, 204, 205, 206, 207, 208, 211, 212, 34, 35, 70, 89, 218, 88, 221

[56] References Cited

U.S. PATENT DOCUMENTS

| | | | |
|---|---|---|---|
| 3,704,348 | 11/1972 | McIntosh et al. | 379/35 |
| 3,851,121 | 11/1974 | Marvin | 379/85 |
| 4,527,015 | 7/1985 | Chambers et al. | 379/105 |
| 4,559,416 | 12/1985 | Theis et al. | 379/34 |
| 4,712,230 | 12/1987 | Rice et al. | 379/112 |
| 4,815,120 | 3/1989 | Kosich | 379/34 |
| 4,831,648 | 5/1989 | Nishino | 379/95 |
| 4,839,917 | 6/1989 | Oliver | 379/45 |
| 4,901,341 | 2/1990 | Carter et al. | 379/67 |
| 4,924,488 | 5/1990 | Kosich | 379/34 |
| 5,142,560 | 8/1992 | Neer | 379/7 |
| 5,199,062 | 3/1993 | von Meister et al. | 379/89 |
| 5,206,901 | 4/1993 | Harlow et al. | 379/211 |
| 5,243,642 | 9/1993 | Wise, Jr. et al. | 379/82 |
| 5,351,287 | 9/1994 | Bhattacharyya et al. | 379/95 |

OTHER PUBLICATIONS

ALLTEL Message Monitor Model 400MM User Guide.
Fagin and Beillard, "A Microcontroller–Based System for Intelligent Telephony", *IEEE Transactions on Consumer Electronics*, vol. 38, No. 4, Nov. 1992.

*Primary Examiner*—Jeffery A. Hofsass
*Assistant Examiner*—Scott Wolinsky
*Attorney, Agent, or Firm*—Jones & Askew

[57] ABSTRACT

A communications monitoring and control system including methods and apparatus for processing a communication directed to a called party. Upon receipt of a communication, the system determines the location of the called party from a changeable list including locations selectively provided by the called party. The communication may be accepted, rejected or monitored by the called party at the locations provided. If rejected, the communication is routed to a message service. If monitored, the communication is routed to a message service, and a one-way connection from the communication to the called party is established. The calling party is unaware of the connection. The called party may discontinue monitoring or connect to the communication at any time during the communication.

32 Claims, 7 Drawing Sheets

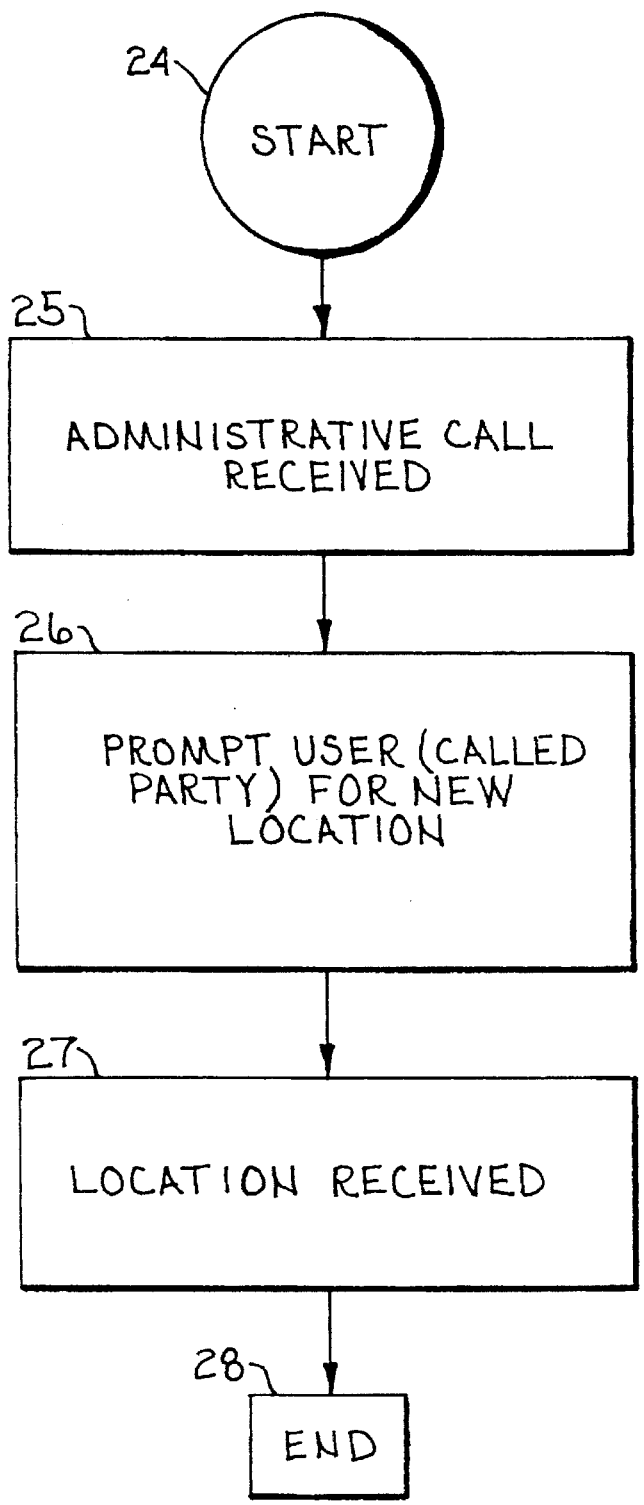

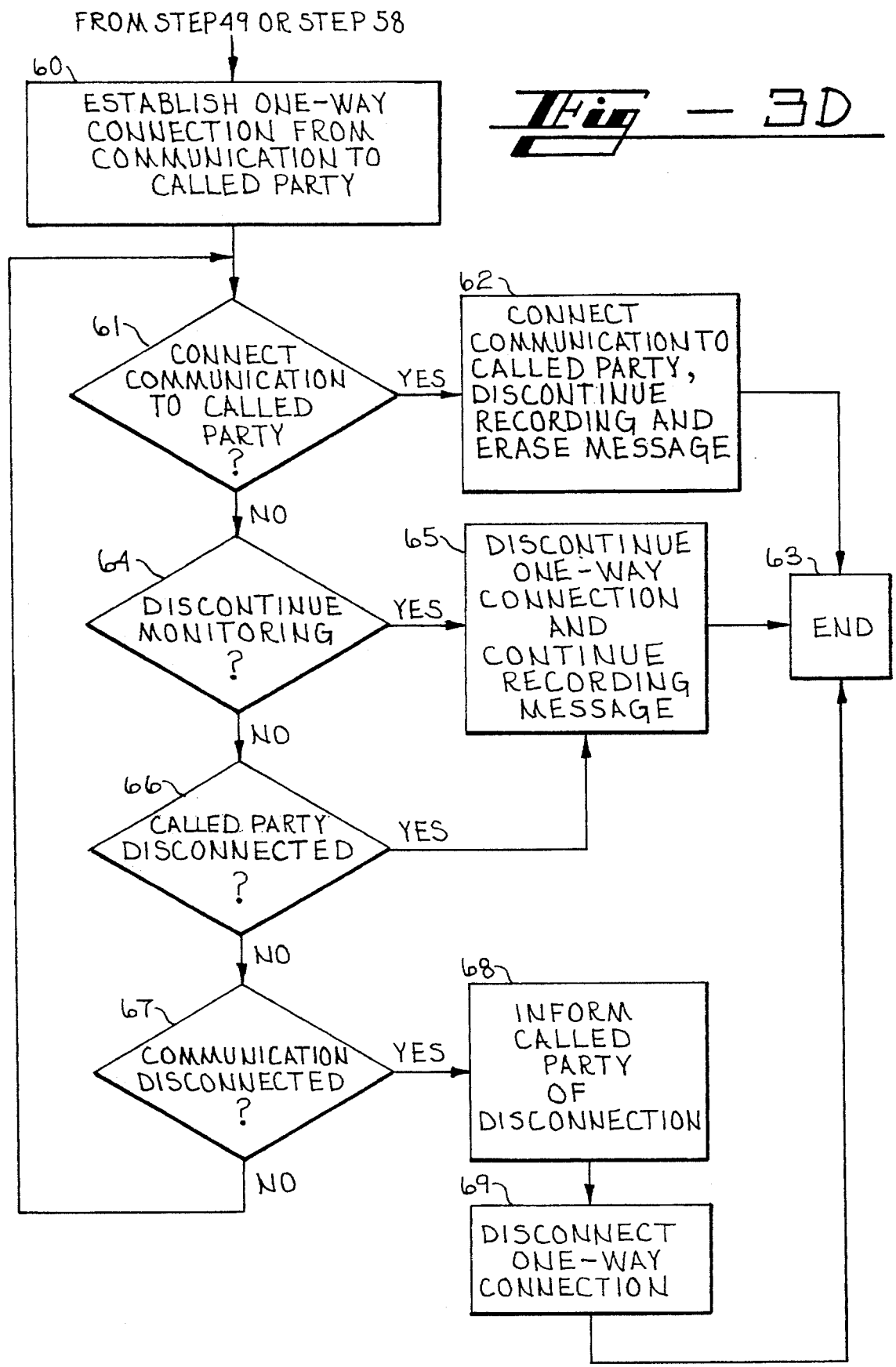

COMMUNICATIONS MONITORING AND CONTROL SYSTEM

TECHNICAL FIELD

The present invention generally relates to communication systems, and more particularly relates to a method and apparatus for monitoring and controlling communications directed to a called party.

BACKGROUND OF THE INVENTION

In this age of communication, there can be too much of a good thing. Telephone calls and messages of a miscellaneous nature and from a variety of sources can inundate an individual. Otherwise welcome personal calls from family and friends may be ill-timed. Business calls from employers or employees, from clients or customers, and from suppliers or contractors can range from the petty to those of the paramount importance. In addition, telephone calls are used by a host of enterprising individuals and businesses to reach out on behalf of myriad organizations. Thus, one caller may seek a contribution from the called party to benefit a good cause. Another caller may seek to sell something to the called party such as an insurance policy, a pest control service, or even a set of steak knives. Yet another caller may conduct a poll, survey or request other information. Further, telephone calls to the wrong number or misdirected calls can be an annoyance. These intrusive telephone calls can range from a slight hindrance to a significant impediment to getting anything done.

The prior art offers several examples of devices used to separate the important telephone calls from the chaff. Telephone answering machines are used often to screen calls. Generally, a call may be answered by the answering machine after a predetermined number of rings. If the called party is in the near vicinity of the answering machine, the called party may listen through the speaker of the answering machine to the message as it is being left by the calling party. In most telephone answering machines, the called party may interrupt the recording of the message and speak directly to the caller by picking up the telephone receiver. Often, this results in a partial message left on the recording medium of the answering machine. The partial message takes up space that might be used for other telephone messages.

There are several other disadvantages to the use of a telephone answering machine as a monitoring device. The first disadvantage is the expense of purchasing and maintaining a telephone answering machine. A good quality unit may involve a significant monetary expenditure. As with any mechanical device, the answering machine may malfunction or require repairs, especially if it is frequently in use.

A second, and significant, disadvantage to the use of the telephone answering machine as a monitoring device is that the called party must be in the near vicinity of the answering machine when a call is received to hear the caller's message. This disadvantage is based on two characteristics of the answering machine. First, the answering machine must be connected to a telephone line, and through such connection, the answering machine is not a readily portable device. Second, the speaker location and volume of the answering machine (together with the hearing capability of the called party) determine the proximity necessary for the called party to hear the message.

The limited ability of the telephone answering machine to function as a monitoring device is demonstrated through the example of a multi-telephone household with the telephone/answering machine located in the living room and telephones located in other parts of the house, such as the kitchen or master bedroom. The called party may hear the telephone ring in the living room, kitchen or master bedroom. However, the called party may hear the message being left on the answering machine only in the living room. Thus, to monitor the call, the called party has to hurry from the other part of the house to the living room. By the time the called party gets to the living room, the caller may have already finished leaving a message. If the called party is not at home when a call is received it is impossible for the called party to monitor the call. The telephone answering machine does not allow the called party to monitor calls when the called party is present at locations remote from the answering machine. This disadvantage effectively limits the screening use of the answering machine to the time the called party spends near the telephone/answering machine.

Another prior art device which can be used to monitor telephone calls is a voice mail system. Generally, a voice mail system is similar to a telephone answering machine in that the system records messages left by callers. Some voice mail systems allow for monitoring of a message while it is being recorded. These voice mail systems share the same disadvantages of answering machines when used as monitoring devices. First, voice mail systems are relatively expensive, especially for personal rather than business use. Some systems require specialized telephone units. Second, voice mail systems require maintenance and repair, often by specialized technicians. Most importantly, voice mail systems require the called party to be in close proximity to the telephone having voice mail features to use message monitoring. Voice mail systems do not provide for remote monitoring in real-time by the called party.

Another prior art device, the ALLTEL Message Monitor, Model 400 MM, combines the features of an answering machine and a voice mail system. However, such a device does not overcome the disadvantages common to both with respect to message monitoring. The ALLTEL Message Monitor is manufactured by Dees Communications Engineering, Delta, British Columbia, Canada and Redmond, Wash.

This unit is connected in series with a touch tone telephone. The user must have three way calling and touch tone service. The unit automatically forwards unanswered telephone calls to a voice mail system or to any other programmed telephone number. All calls received by the unit can be monitored through an internal speaker on the unit. Calls can be intercepted by lifting the handset of the telephone to which the unit is connected. However, the unit shares the disadvantages common to answering machines and voice mail systems with respect to monitoring telephone calls and has some disadvantages of its own. The unit is different from the other prior art devices in that it requires the user to have a touch tone telephone, touch tone service, and three-way calling service. These requisite characteristics increase the expense of the unit. The shared disadvantages include the relative expense involved in purchasing and setting up the unit, as well as the expenses in maintaining and repairing the unit. The greatest disadvantage is common to all three types of prior art devices and that is the inability to provide for monitoring of received telephone calls remote from the physical location of the unit.

Accordingly, there is a need for a communications monitoring and control system which provides a called party with the ability to monitor and control communications from the called party. In particular, there is a need for a system which provides a called party with the ability to monitor communications from a location remote from the location to which the communications are directed. There is a need for a monitoring and control system which allows the called party to intercept the communications whether the called party is at the location of the called number or at a remote location. There is also a need for a monitoring and control system which is operative with miscellaneous communications services including call waiting services. In addition, there is a need for a system which provides a called party with a monitoring and control system that is relatively inexpensive, that does not require additional on-premises equipment, and that is easy to maintain and to service.

SUMMARY OF THE INVENTION

As will be seen, the present invention satisfies the foregoing criteria. Stated generally, the communications monitoring and control system of the present invention receives a communication directed to a called party, routes the communication to a message service, and establishes a one-way connection from the communication to the called party, whereby the routed communication may be monitored by the called party through the one-way connection.

In particular, the present invention receives a communication directed to a called party and determines the location of the called party. The location is determined by reference to a list provided by the party. Preferably, the list includes at least two locations and corresponding telephone numbers where the called party may be reached. The locations in the list may change as circumstances or travel patterns allow.

The ability of the present invention to determine the location of a called party based upon a list allows the party to make use of the present invention from a variety of locations. For example, a salesperson may provide the present invention with a list including locations other than the sales office, such locations including customer offices. Thus, if the salesperson receives a call while at a customer's office, the present invention can be used to monitor the call. Should the salesperson move to another customer's office, the location list can be updated accordingly through simple administrative procedures, and the features of the present invention will be available to the salesperson at the next location. If the salesperson has a cellular telephone, the features will be available while the salesperson is in transit.

After determining the location of the called party, the present invention calls the called party. Preferably, if the called party picks up the call within a predetermined time, such as the first three rings, the present invention requests information relating to one of three choices for disposition of the communication. First, this disposition information may include an acceptance of the communication in which case the communication is routed to the called party. Second, the disposition information may include rejection of the communication in which case the communication is routed to a message service. The communication may be recorded by the message service. Third, the disposition information may include a request for monitoring in which case the communication is routed to a message service and a one-way connection from the communication to the called party is established. Also in this third choice, the communication may be recorded by the message service. The communication may be monitored through this one-way connection without the calling party being aware of the monitoring.

In the preferred embodiment, if the called party does not pick up the call within a first predetermined time, the present invention routes the communication to the message service, but provides a second predetermined time, such as two additional rings, to the called party to pick up the call before the call is terminated. The first predetermined time represents a compromise between the desire of a calling party to avoid waiting a long time before the communication is handled, and the desire of the called party to have enough time to respond to the incoming call. The second predetermined time represents a compromise between the desire of the called party to have enough time to respond to the incoming call and the general desire that the telephone stop ringing after a while. Once the communication is routed to the message service, the message service may record the communication. If the called party picks up the call on the fourth or fifth rings, the present invention requests information relating two choices for disposition of the communication. First, the called party may choose to be connected to the communication in which case the communication is routed to the called party. Any partial message left with the message service is erased. Second, the called party may choose to monitor the communication in which case a one-way connection from the communication to the called party is established. This communication is still recorded by the message service. The communication may be monitored through this one-way connection without the calling party being aware of the monitoring.

Once the called party begins monitoring the communication, if the called party does not desire to further monitor the communication, then the called party has two options: (1) discontinue monitoring; or (2) have the communication connected to the called party. Either of these options may be exercised at any time during the monitoring of the communication. To discontinue monitoring, the called party provides an indication to the present invention to disconnect the one-way connection. Upon receipt thereof, the present invention discontinues the one-way connection, whereby the monitoring of the communication is discontinued, but the communication remains connected to the message service. To have the communication connected to the called party, the called party provides an indication to the present invention to connect the communication. Upon receipt of the indication, the present invention discontinues the one-way connection, and establishes a two-way connection between the communication and the called party. If the communication was being recorded by the message service, the present invention discontinues such recording in response to the indication for connection by the called party. After discontinuing the recording, the present invention erases any of the communication recorded by the message service. This erasure saves recording medium for the recording of other communications.

The present invention is useful in connection with communications directed to locations having simultaneous call capability on the same telephone number, (e.g. call waiting, hunt group, or multicall appearance services). In operation, upon receipt of a communication, the present invention calls the called party having the simultaneous call capability. If the called party is communicating on one of the calling lines then, in a well known manner, a signal is provided to the called party that a call is waiting on another calling line. Also in a well known manner, the called party may decide to be connected to the other (second) calling line and provide an indication of such decision. As in the case described above, the called party is provided a first predetermined time, such as two call waiting tones, to answer the call before the communication is routed to the message service. The called party also is provided a second predetermined time, such as an additional call waiting tone, to answer the call before the call is terminated. Once the called party is connected to the second calling line, the present invention operates in the same manner as if the called party did not have simultaneous call capability services.

In addition, the present invention provides an improved communication monitoring system, which enables a called party to monitor selectively a communication routed to a message service. In general, the present invention includes a transceiver such as an end office in the preferred embodiment for receiving the communication and for transmitting the communication to a switching point. The communication includes an identification number. The switching point reads the number, and in response requests the service control point (SCP) for communication handling instructions. The service control point compares the identification number to entries in the service control point database and provides to the switching point the communication handling instructions corresponding to the identification number, such as the identity of the service node to which the communication should be transferred. The switching point provides the communication to the identified service node, which then requests call information regarding the communication from the service control point. The call information may include information such as location of the called party and an indication of any enhanced service treatment (monitoring). The service control point responds by providing the call information including location information so that the communication may be routed to the called party and including a feature indication for monitoring.

The service node initiates a call to the called party requesting disposition information. Preferably, if the called party picks up the call within the first predetermined time, the called party has three options: accept the communication, reject the communication, or monitor the communication. In response to an acceptance of the communication, the service node has a two-way connection for the communication established between the calling and called parties. In response to a rejection of the communication, the service node has the communication routed to a message service where the communication may be recorded. In response to a request to monitor the communication by the called party, the service node has the communication routed to the message service where it may be recorded, and the service node has a one-way connection established from the communication to the called party.

Preferably, if the called party fails to pick up the call from the service node within the first predetermined time, the service node has the communication routed to the message service where it may be recorded. If the called party picks up the call within the second, additional predetermined time, the called party has three options: connection to the communication, rejection of the communication or monitoring of the communication. In response to a request for connection to the communication, the service node has established a two-way connection for the communication between the calling and called parties. The service node provides for erasure of any partial message left with the message service. In response to a rejection of the communication, the service node disconnects itself from the communication. There is no connection made between the calling and called parties. In response to a request for monitoring of the communication, the service node has a one-way connection established from the communication to the called party.

In addition, once the called party begins monitoring the communication, the service node responds to further instructions from the called party. In response to receiving an indication from the called party to disconnect the one-way connection, the service node has the one-way connection discontinued. However, the communication remains connected to the message service. In response to receiving an indication from the called party to connect the communication to the called party, the service node has the one-way connection discontinued, and has a two-way connection between the communication and the called party established. The service node provides for erasure of any partial message left with the message service.

In an embodiment of the present invention, the message service records the communication. The message service includes an eraser for erasing the record of a communication which has been interrupted by a disconnection of the communication from the message service and a two-way connection of the communication to the called party.

Advantageously, the present invention allows a called party to monitor a communication so as to determine whether to accept the communication, to reject the communication, or to monitor the communication. The called party saves time and money because the present invention does not require the called party to purchase special equipment or special communication services. The called party enjoys the use of the features of the present invention from a variety of locations. The called party will not miss important telephone calls while away from the office or be disturbed by annoying calls while meeting with a special client. In addition, the present invention complements other subscriber services such as simultaneous call capability services.

Therefore, it is an object of the present invention to provide an improved communications monitoring and control system.

It is also an object of the present invention to provide a communications monitoring and control system that does not require the purchase of special equipment or special communications services.

It is another object of the present invention to provide a communications monitoring and control system that may be used at all the telephone extensions of a particular location or assigned to a particular calling line.

It is an additional object of the present invention to provide a communications monitoring and control system that is operative with most communication devices or communication services.

It is yet another object of the present invention to provide a communications monitoring and control system that may be used at any location designated by a called party.

It is also an object of the present invention to provide a communications monitoring and control system that allows the called party to choose to accept communications and to have the communications routed to any particular location chosen by the called party.

It is another object of the present invention to provide a communications monitoring and control system that allows the called party to monitor communications directed to a particular number, and to monitor such communications from any particular location chosen by the called party.

That the present invention and the preferred embodiments thereof overcome the drawbacks set forth above and accomplish the objects of the invention set forth herein will become apparent from the detailed description of the preferred embodiments to follow.

BRIEF DESCRIPTION OF THE DRAWINGS

FIG. 2 is a flow chart illustrating the general method of updating the list of called party location pursuant to the preferred embodiment of the present invention.

FIGS. 3A–3E is a flow chart illustrating the general method of processing a communication pursuant to the preferred embodiment of the present invention.

DETAILED DESCRIPTION

Figure 1:
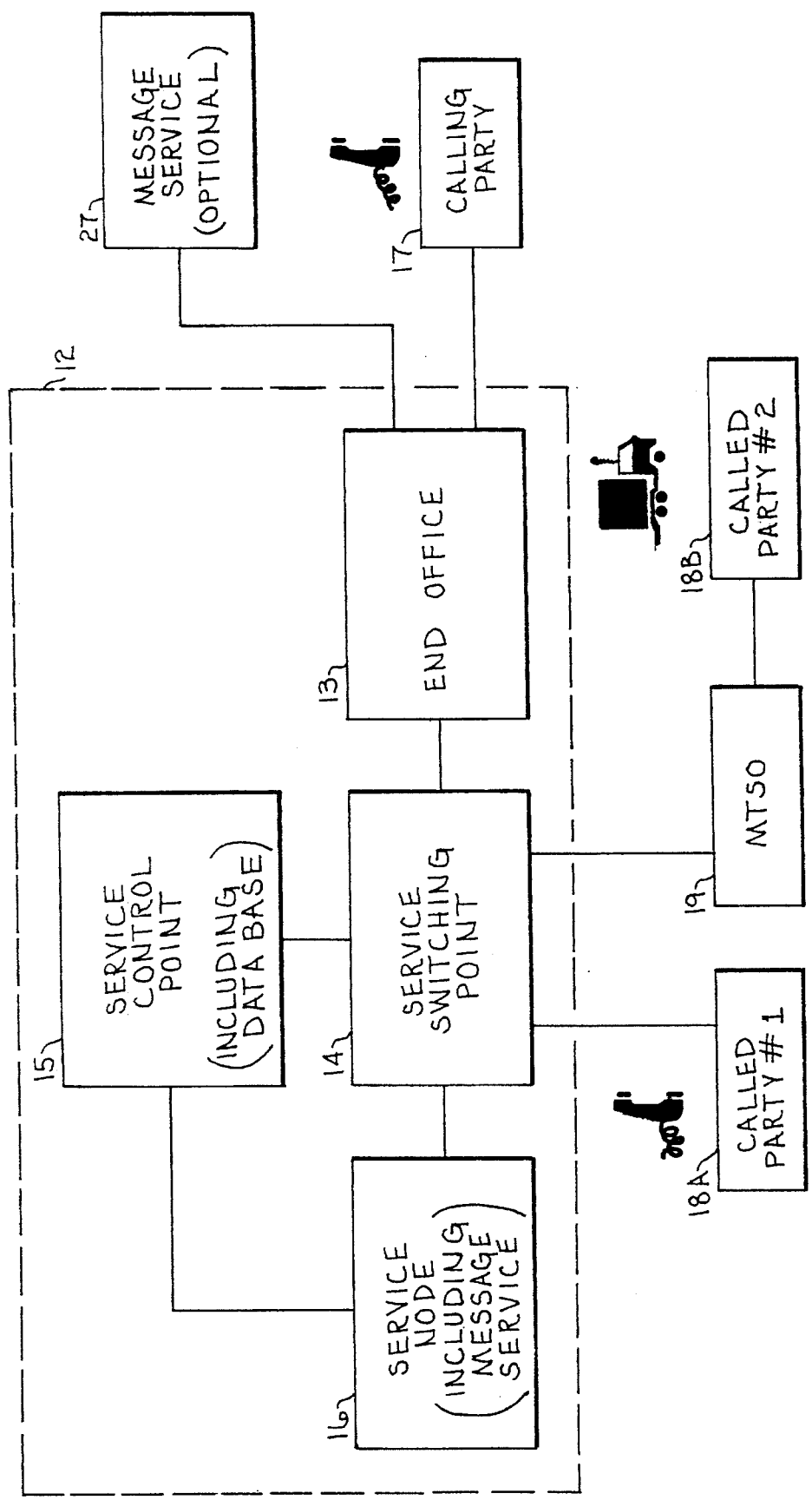
FIG. 1 is a block diagram illustrating the preferred environment of the present invention.

Referring now to the drawings, in which like numerals indicate like elements throughout the several figures, FIG. 1 is a block diagram illustrating the preferred environment of the present invention, which includes a method and an apparatus for a communications monitoring and control system. Stated generally, one embodiment of the present invention receives a communication directed to a called party, routes the communication to a message service, and establishes a one-way connection from the communication to the called party, whereby the routed communication may be monitored by the called party through the one-way connection.

As shown in FIG. 1, the system preferably operates with the public switched telephone network (PSTN) 12 to deliver a communication with monitoring services from a calling party 17 to a called party 18A. The PSTN 12 comprises the well known components of an end office 13, a service switching point (SSP) 14, a service control point (SCP) 15, and a service node 16. In the preferred embodiment, the service node is the BellSouth service node. Service nodes, such as the BellSouth service node, are available from AT&T Network Systems, Chicago, Ill. The system also operates with the PSTN 12 and one or more mobile telephone switching offices such as MTSO 19 shown in FIG. 1 to deliver a communication with monitoring services from the calling party 17 to a called party 18B using a cellular telecommunications device. Although the present invention preferably operates in connection with one or more end offices such as end office 13 in FIG. 1, the present invention may be configured to operate with other telecommunications switching mechanisms including a private branch exchange (PBX).

In general, the present invention receives, at end office 13, a communication from a calling party 17. The communication is directed to a called party 18A, 18B by a called party identification number such as a telephone number entered by the calling party and associated with the communication in a manner well known to those of ordinary skill in the art. The received communication may be a telephone call or any other real-time communication such as a video call, cellular communication, or electronic mail. Preferably, the communication is routed from the receiving end office 13 through the PSTN 12 on the basis of the called party identification number until the communication reaches a service switching point 14 serving communications directed to the called party identification number.

The service switching point 14 reads the called party identification number of the communication or other data accompanying the communication and checks with the service control point 15 for communication handling instructions. The inclusion and reading of information to trigger special handling of a communication is well known to those skilled in the art. Preferably, the switching point 14 provides the service control point 15 with the identification number and any other related information.

In the preferred embodiment, the service control point 15 comprises a database including entries of identification numbers and handling instructions for each such entry. The service control point 15 compares the identification number received from the switching point 14 with entries in the database in order to determine whether the called party identification number, and hence, the communication directed to the called party 18A, 18B is to receive monitoring services. The service control point 15 responds to the switching point 14 with the handling instructions, such as the service node 16 to which the communication is to be routed. Upon receiving the handling instructions including a positive determination regarding monitoring services, the service control point 15 directs the switching point 14 to route the communication to the service node 16. Upon a negative determination regarding monitoring services, the switching point 14 provides the communication with default treatment by routing the communication to the called party 18A, 18B without monitoring services.

As noted, in the preferred embodiment, a positive determination regarding monitoring services results in routing of the communication to the service node 16. The service node 16 queries the service control point 15 for call information regarding the communication. The service control point 15 provides such call information, preferably including routing and monitoring information, to the service node 16. The routing information contains the destination number associated with the called party's current location. The routing information is determined by the service control point 15 by checking a list of locations for a particular called party. In the preferred embodiment, the list of locations is stored in a database maintained at the service control point 15. The list of locations preferably includes the telephone numbers of at least two locations provided by the called party (also referred to as the user or subscriber of monitoring services). In operation, the present invention tries to reach the called party 18A, 18B at a first location. If unsuccessful, the present invention tries to reach the user at a second location such as the mobile telephone of the called party.

The ability of the present invention to determine the location of the user (called party) from the list of locations allows the user to make use of the present invention from a variety of locations. The user may update the list as circumstances or travel patterns allow. FIG. 2 is a flow chart illustrating the general method of updating the list of locations. FIG. 2 is entered at step 24, and in step 25, the present invention receives an administrative call from the user. Preferably, the user can use any touch-tone telephone to dial in a preselected administrative telephone number for updating the list of locations. In step 26, the present invention prompts the user, via prerecorded messages, to enter the new location(s) on the list using the user's telephone. In step 27, the present invention receives the new location(s) from the user, and makes the substitution(s) in the list, and in step 28 the process of changing the list ends. Thus, a user may use the present invention in connection with telephone service provided to the user's office, but if the user is about to spend the day at a customer's office the user can update the list of locations to provide the customer's office telephone number as a location for telephone calls. If the user receives a call at the customer's office, the user may use the present invention to accept, reject or request monitoring of the call.

The present invention may be used in connection with a personal number service used by a called party. Generally, a personal number service provides a personal number to each subscriber of the service. Communications such as telephone calls are directed (dialed) using the personal number. The personal number service locates the subscriber based on a predetermined list of locations. The communication is routed to the subscriber at the location determined by the service. Additional details regarding personal number services are found in the United States patent application entitled "Personal Number Communication System," Ser. No. 07/936,384, filed on Aug. 26, 1992, which is incorporated herein by reference. In the present invention, a communication directed to a called party with a personal number is treated similarly to a communication directed to a called party with a conventional telephone number. In the personal number case, the service control point 15 recognizes the calling line identification number as a personal number and consults the appropriate entries in a database relating to that personal number in order to provide the service switching point 14 with handling instructions and in order to provide the service node 16 with call information including routing and monitoring information.

Referring again to FIG. 1, in the preferred embodiment, after the location of the called party is determined, the present invention calls the called party at the determined location. In the preferred embodiment, the call is initiated by the service node 16. If the called line is busy, or if there is no answer the communication is routed to a message service. Preferably, the message service records the communication of the calling party. The resulting communication (talk) path is from the originating end office 13 to the service switching point 14 to the message service.

In the preferred embodiment, the message service is provided by service node 16, and includes a voice mail service. The message service also may comprise an answering machine-type service, or any other real-time connection-oriented electronic messaging service including a video voice mail service or an electronic mail equivalent of a voice mail service. The service node 16 may also route the communication to an external message service 29 based on the telephone number of the external message service 29 provided by the service control point 15. The service node 16 then disconnects itself from the communication by sending a transfer message to the service switching point 14. The external message service 29 may be, for example, a voice mail service or an answering machine which functions as a peripheral device to a telephone. The external message service 29 may also include a personal message service such as a secretary, a receptionist, or a service bureau.

The communication is routed to the message service, whether internal or external, by the service node 16 if the called party fails to answer the call after a preselected interval or a preselected number of rings. The preferred embodiment provides the called party with five rings to pick up the call. In addition, the preferred embodiment makes a distinction between a call which is picked up by the called party within a first predetermined period, such as three rings, and a call which is picked up within a second predetermined period, such as during the fourth or fifth rings. If the called party picks up during the first three rings of the call, the called party is presented with three choices. As described in detail below, the called party may choose to accept and be connected to the communication, to reject the communication, or to request monitoring of the communication while it is connected with the message service.

After the third ring to the called party, the present inventions routes the communication to the message service. If the called party picks up the call during the fourth or fifth rings, the called party again has three choices which are based on the communication having been already routed to the message service. As described in detail below, the called party may choose to be connected to the communication, the called party may choose to monitor the communication, or the called party may reject the communication. By failing to pick up within the first three rings, the called party fails to head off the communication before it is routed to the message service. However, the two extra rings provide the called party with an opportunity to be connected to the communication. Advantageously, the five ring feature of the preferred embodiment ensures that the calling party always reaches the message service within a predetermined time (three rings). In addition, the called party is provided with an additional amount of time (an extra two rings, or an additional 66% amount of time) to decide whether to be connected or to monitor the communication. In the preferred embodiment, the called party is unable to monitor the communication unless the call is picked up during the five rings. In other words, if the communication is routed to the message service for failure of the called party to pick up the call, the called party is unable after five rings to start monitoring the communication.

If the called party answers the call from the service node, the called party is advised of the communication. The called party may be advised by direction of service node 16 of the calling line identification number of the calling party, and/or the name associated with the identification number or calling line. The called party is provided with this information whether the called party picks up the call within three rings or five rings. The called party then is requested to provide information relating to the disposition of the communication.

As noted, if the called party picked up within the first three rings, the called party has three choices: accept the communication; reject the communication; or request monitoring of the communication. If the called party accepts the communication, the communication is routed to the called party. In the preferred embodiment, service node 16 routes the communication from the calling party to the called party as an ordinary communication, and then the service node disconnects itself from the communication by sending a transfer message to the service switching point 14. The resulting communication (talk) path is from the originating end office 13 to the switching point 14 to the called party 18A, 18B.

If the called party rejects the communication, the communication is routed to the message service. If the message service is internal, the service node 16 connects the communication to the internal message service. If the message service is external, the service node 16 routes the communication to the message service 29 and then disconnects itself from the communication by sending a transfer message to the service switching point 14. The resulting communication (talk) path is from the originating end office 13 to the service switching point 14 to the internal or external message service.

If the called party requests monitoring of the communication, the communication is routed to the message service and a one-way connection from the communication to the called party is established via service node 16 so that the called party may monitor the communication. In the preferred embodiment, the routing of the communication to the message service and establishment of the one-way connection is directed by the service node 16. Upon connection to the message service, the calling party is provided with typical message service announcement information just as if the communication were made directly to the message service without monitoring. The called party also hears this announcement information and then the called party hears the message as it is being left by the calling party. The one-way connection provides the called party with the ability to monitor the communication without the calling party aware of the monitoring.

If the called party picks up the call from the service node on the fourth or fifth rings, the service node already will have routed the communication to the message service, but will not yet have disconnected from the communication. This allows the service node 16 to maintain control over the communication so that the called party has options regarding the communication. The called party is advised of the communication and preferably, is provided with the calling line identification number of the calling party, and/or the name associated with the identification umber or the calling line. The called party then is requested to provide information relating to the disposition of the communication. In particular, the called party is requested to indicate whether the communication should be connected to the called party, whether the called party desires to monitor the communication, or whether the called party desires to reject the communication. In the preferred embodiment, the called party indicates the choice regarding the disposition of the communication by pressing a preselected number such as "1" on the touch-tone telephone used by the called party. An indication to reject the communication may be provided by simply hanging up the telephone.

Upon receipt of an indication to connect the communication, the present invention terminates the connection between the communication and the message service, discontinues the one-way connection to the called party, and establishes a two-way connection between the communication and the called party. In the preferred embodiment, service node 16 instructs switching route 14 to terminate the connection between the communication and any external message 29, and to route the communication from the calling party to the called party as an ordinary communication. The service node 16 then disconnects itself from the communication by sending a transfer message to the service switching point 14. The resulting communication (talk) path is from the originating end office 13 to the switching point 14 to the called party 18A, 18B.

In addition, the present invention provides for the erasure of the message service record of the communication interrupted by the two-way connection of the communication to the called party. For example, in the preferred embodiment, the communication is routed to the message service after the third ring to the called party. The calling party hears the typical announcement information provided by the message service and begins to leave a message with the service. The called party picks up during the fourth or fifth rings, is advised of the communication, and indicates a desire to be connected to the communication. The two-way connection is made, and the parties are connected. In practice, the called party may have to interrupt the calling party as he/she is leaving a message to make the calling party aware that the called party has been substituted for the message service. In prior art devices, the first part of this interrupted communication would have been left on the recording medium of the message service. The present invention provides for the erasure of the recorded part of the interrupted communication. The erasure feature saves space on the recording medium. It also saves the called party time and effort because the called party does not have to listen to these partial messages, and the called party does not have to erase the partial messages. If an internal message service 16 is used, erasure is done automatically. If an external message service 29 is used, service node 16 may provide signaling, such as DTMF tones, to the external message service 29 via switching point 14 to indicate that the message should be erased.

If a called party who picks up the call from the service node during the fourth or fifth rings indicates a desire to monitor the communication, the present invention establishes a one-way connection from the communication to the called party. Upon connection to the communication, the called party is able to monitor the communication as it is being left by the calling party. The calling party is unaware of the monitoring.

If the called party desires to reject the communication, which is already connected to the message service, the called party may press a preselected number, or simply hang up. In this case, if an external message service 29 is used, the service node 16 disconnects itself from the communication by sending a transfer message to service switching point 14. The resulting communication path is from end office 13 through switching point 14 to the internal message service in node 16 or to the external message service 29.

Once the called party begins monitoring the communication, if the called party does not desire to further monitor the communication then the called party has two options: (1) discontinue monitoring; or (2) have the communication connected to the called party. Either of these options may be exercised at any time during the monitoring of the communication. To discontinue monitoring, the called party provides an indication to disconnect the one-way connection. In the preferred embodiment, the indication to discontinue monitoring is made by pressing a preselected number on the touch-tone telephone used by the called party, or by simply disconnecting by hanging up the telephone. Upon receipt by service node 16 of an indication to discontinue monitoring, the present invention discontinues the one-way connection, whereby the monitoring of the communication is discontinued, but the communication remains connected to the message service. If an external message service 29 is used, the service node 16 disconnects itself from the communication by sending a transfer message to the switching point 14. The resulting communication (talk) path is from the originating end office 13 to the switching point 14 to the internal message service in node 16. In the case of an external message service, from the originating end office 13 to the switching point 14 to the external message service 29 through the appropriate terminating end office. In FIG. 1, the external message service 29 is connected to the PSTN 12 through end office 13, but this connection may be made through any other end office (not shown) that is part of the PSTN 12. The calling party communicates with the message service without knowledge that the called party was monitoring the communication, or that the called party discontinued monitoring the communication.

To have the communication connected to the called party, the called party provides an indication to connect the communication. As with the indication to discontinue monitoring, in the preferred embodiment, the indication to connect the communication to the called party is made by pressing a preselected number such as "1" on the touch-tone telephone used by the user. The indication to connect may be made by the called party at any time during the communication. Upon receipt of an indication to connect the communication, the present invention terminates the connection between the communication and the message service, discontinues the one-way connection to the called party, and establishes a two-way connection between the communication and the called party. In addition, as explained above, the present invention provides for the erasure of the message service record of a communication interrupted by the two-way connection connection of the communication to the called party. For example, in the preferred embodiment, upon connection to the message service the calling party hears the typical announcement information provided by the message service and begins to leave a message with the service. Sometime during the calling party's message the called party provides an indication to connect the communication, a two-way connection is then established so that the communication is connected to the called party. The present invention provides for the erasure of the recorded part of the interrupted communication.

The present invention is operative with communications directed to locations having simultaneous call capability services on the same telephone number, (e.g. call waiting, hunt group, or multicall appearance services). In operation, upon receipt of a communication, the present invention calls the called party at a particular location. If the called location has call waiting service, (or any other of the simultaneous call capability services), and one of the calling lines assigned to the called location is busy, in a manner well known to those skilled in the art, a signal is provided to the called party that a call is waiting on another calling line. The calling party hears ringing just as in a call to a telephone without call waiting service. To be connected to the second calling line, the called party provides a connection indication and is connected to the second calling line, also in a well known manner. Upon the called party's connection to the second calling line, the present invention operates in the same manner as described above. In sum, if the called party makes a connection to the second calling line within a first preselected amount of time or within a first preselected number of ring cycles, the called party has the options of accepting, rejecting or monitoring the communication. In the preferred embodiment, the called party must make a connection to the second calling line within three ring cycles (heard only by the calling party) in order to have these three options. After the first preselected amount of time such as after third ring cycle, the communication is routed to the message service. If the called party makes a connection to the second calling line during a second preselected amount of time, the called party has the following options regarding the communication already connected to the message service: connection to the communication; monitoring of the communication; or rejection of the communication, all as described above. In the preferred embodiment, the called party must make a connection to the second calling line within the fourth or fifth ring cycles in order to have these latter three options.

In the preferred embodiment, if the called party ignores the signal from the call waiting service (or other simultaneous call capability service) for both the first and second preselected times (five ring cycles in the preferred embodiment) the called party is unable thereafter to monitor the communication.

More then one communication at a time can be monitored by a called party using a simultaneous call capability service and a voice mail service as the message service. For example, a called party can switch back and forth between the monitoring of at least two different communications using the call waiting service. The communications are recorded simultaneously by the internal message service, which generally can accept several calls at one time. However, typically, only one communication at a time can be monitored by a called party having call waiting service and an external answering machine as an external message service 29 because conventional external answering machines generally can handle only one communication at a time.

The features of the present invention may be activated or deactivated as to any particular user (called party) by that user, or any other party having the user access information, through an administrative call from any touch-tone telephone. The user responds to prompts provided by the system with respect to activation/deactivation of the features.

The flow charts in FIGS. 3A–3D provide a detailed description of the process steps executed by the communications monitoring and control system. Using an analogy to electrical circuit diagrams, these flow charts are equivalent to a detailed schematic for an electrical circuit where the provision of the circuitry for electrical circuit blocks corresponds to provision of actual computer instructions for blocks of the flow chart. Thus, the coding of the process steps of these flow diagrams into instructions for suitable commercially available computers is a mere mechanical step for a engineer or other person skilled in the programming art.

FIGS. 3A–3E are flow charts illustrating the general method of processing a communication pursuant to the preferred embodiment of the present invention. Most of the steps are performed by, or at the instruction of, service node 16.

Figure 3A:
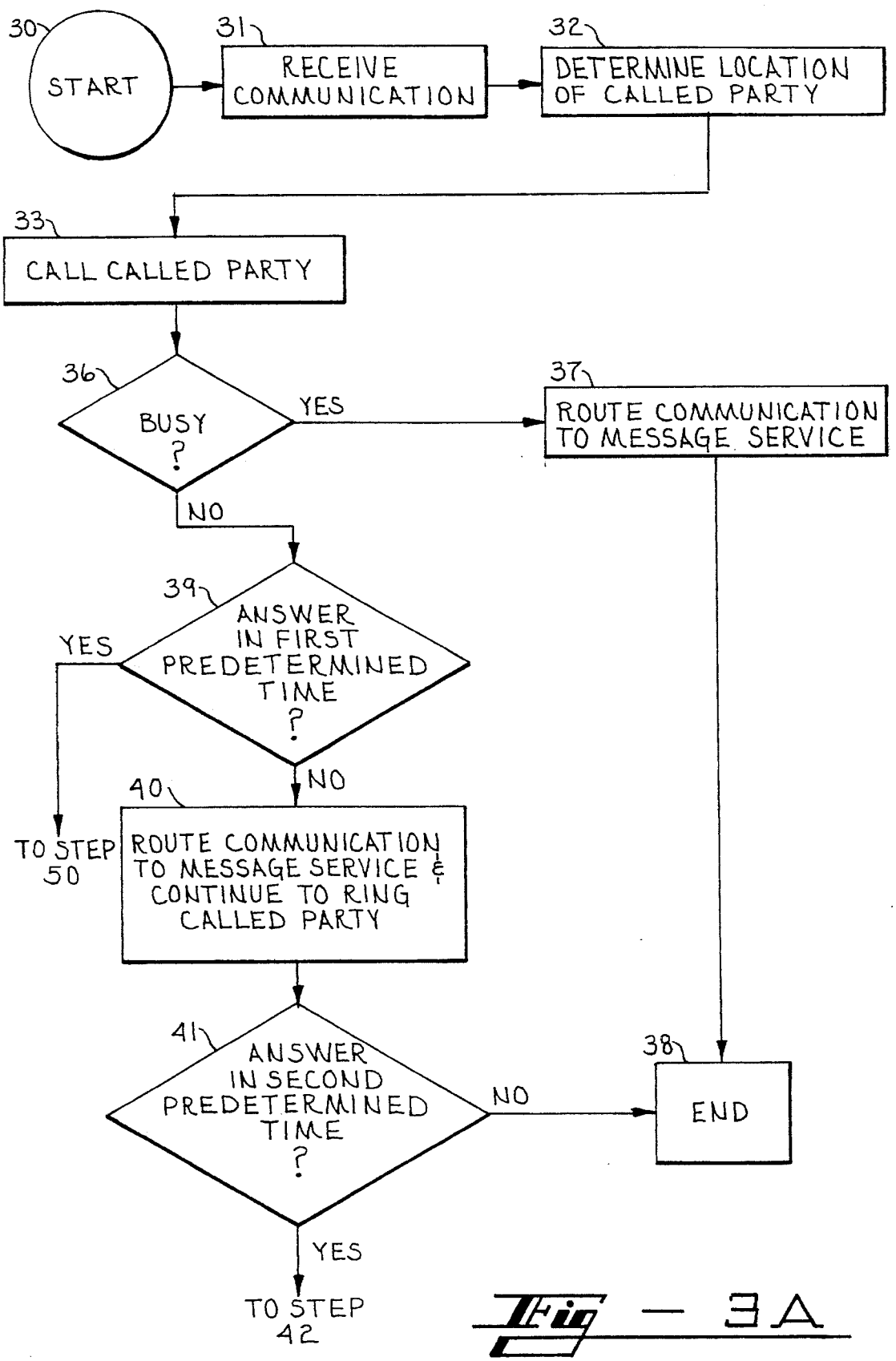

FIG. 3A is entered at step 30, and in step 31, the present invention receives the communication. In most cases, reception of the communication is the result of a called party dialing the telephone number of the called party. As noted above in connection with FIG. 1, in the preferred embodiment, the communication is routed from the originating end office 13 through the PSTN 12 to the service switching point 14, and then to the service node 16. In step 32, the present invention determines the location of the called party. Also as noted above, the location of the called party is determined from a list including at least one location previously provided by the called party.

In step 33 of FIG. 3A, the present invention calls the called party at the location determined in step 32. In step 36, the present invention checks whether the called party's line is busy. If it is busy, then in step 37 the communication is routed to the internal or external message service, and the present invention proceeds to end in step 38. The communication then is treated as a conventional communication to the message service of the called party. If the called party's line is not busy, the present invention proceeds to step 39.

As noted above in connection with FIG. 1, the preferred embodiment makes a distinction between a call which is picked up within a first predetermined amount of time (such as within three rings or two call waiting tones) and a call which is picked up during a second predetermined amount of time (such as during the fourth or fifth rings or by the third call waiting tone). Thus, in step 39 the present invention checks whether the call has been answered by the called party within the first predetermined amount of time. If the call has not been answered within such time, in step 40 the present invention routes the communication to the message service and continues to ring the called party. Preferably, the message service records the communication. In step 41, the present invention checks whether the call has been answered within the second predetermined amount of time. If the call has not been answered during this interval, the present invention proceeds to end in step 38.

Figure 3B:
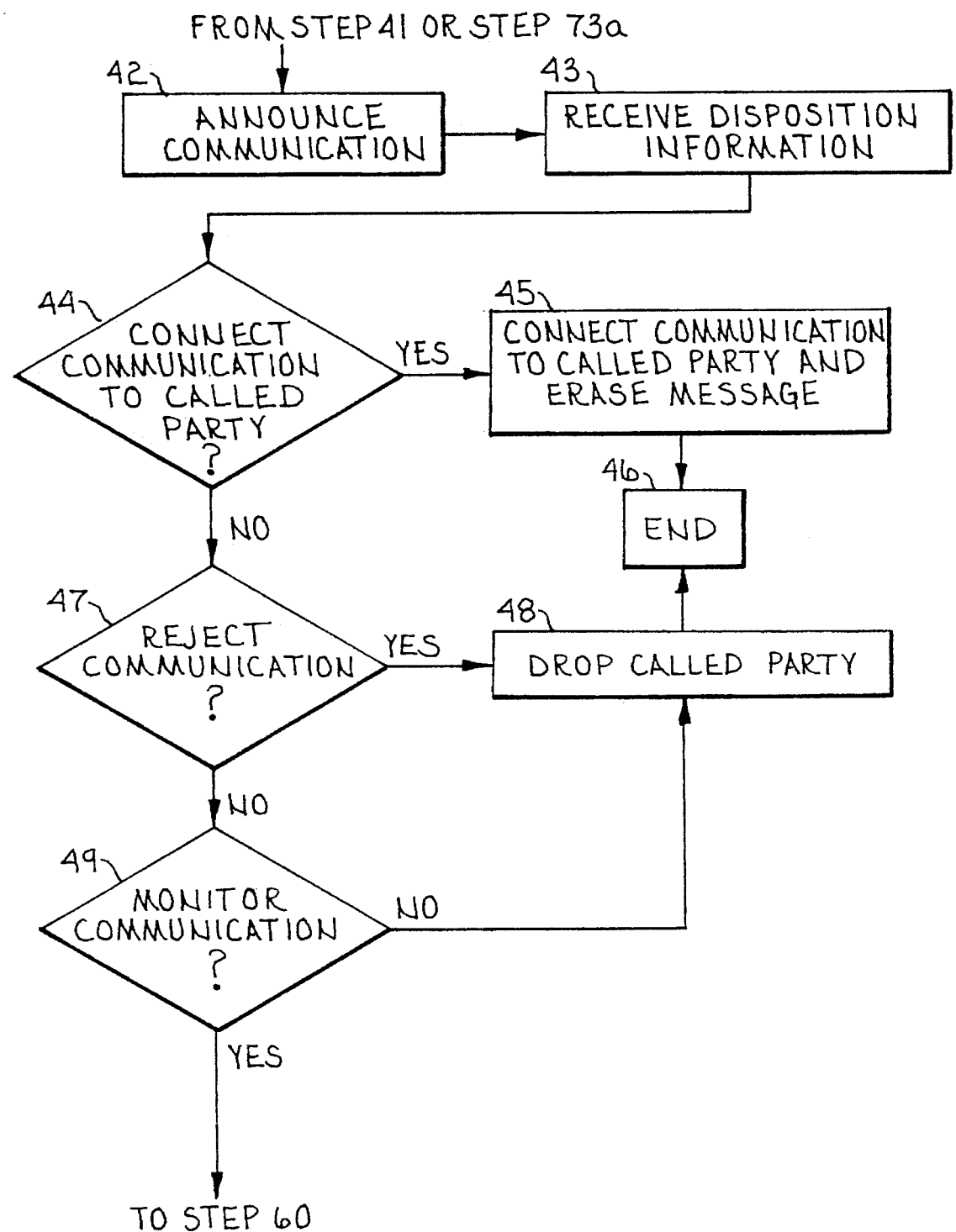

As shown in FIG. 3B, if the call has been answered during the second predetermined amount of time, in step 42 the present invention announces the receipt of a communication to the called party. As part of the announcement, the preferred embodiment may also provide some identification of the source of the communication such as a calling line identification number and/or the name associated with the line. The preferred embodiment requests the called party for disposition information as to the communication. In particular, the preferred embodiment instructs the called party to: press a preselected number on the touch-tone telephone used by the called party to indicate a request to be connected to the communication; press a different preselected number to indicate a rejection of the communication; and press yet another preselected number on the touch-tone telephone to indicate a request to monitor the communication.

In step 43, the present invention receives the disposition information from the called party. In step 44, the present invention checks whether it has received an indication of a request by the called party to be connected to the communication. If so, in step 45 the communication is routed to the called party, and any part of the communication recorded by the message service is erased. Thereafter, the communication is treated as a conventional communication made directly to the called party. The present invention then proceeds to end in step 46.

If the communication is not to be connected to the called party, then in step 47 the present invention checks whether it has received an indication of a rejection. If so, in step 48 the called party is dropped and the communication is treated as an ordinary communication to the message service of the called party. The present invention then proceeds to end in step 46. If there has been no indication of rejection, then in step 49 the present invention checks whether it has received an indication of a request to monitor the communication. If no request to monitor has been received, the present invention drops the called party in step 48 and then proceeds to end in step 46. The communication is treated as an ordinary communication to the message service of the called party. If a request to monitor the communication has been received, the present invention proceeds to step 60 discussed below.

Figure 3C:
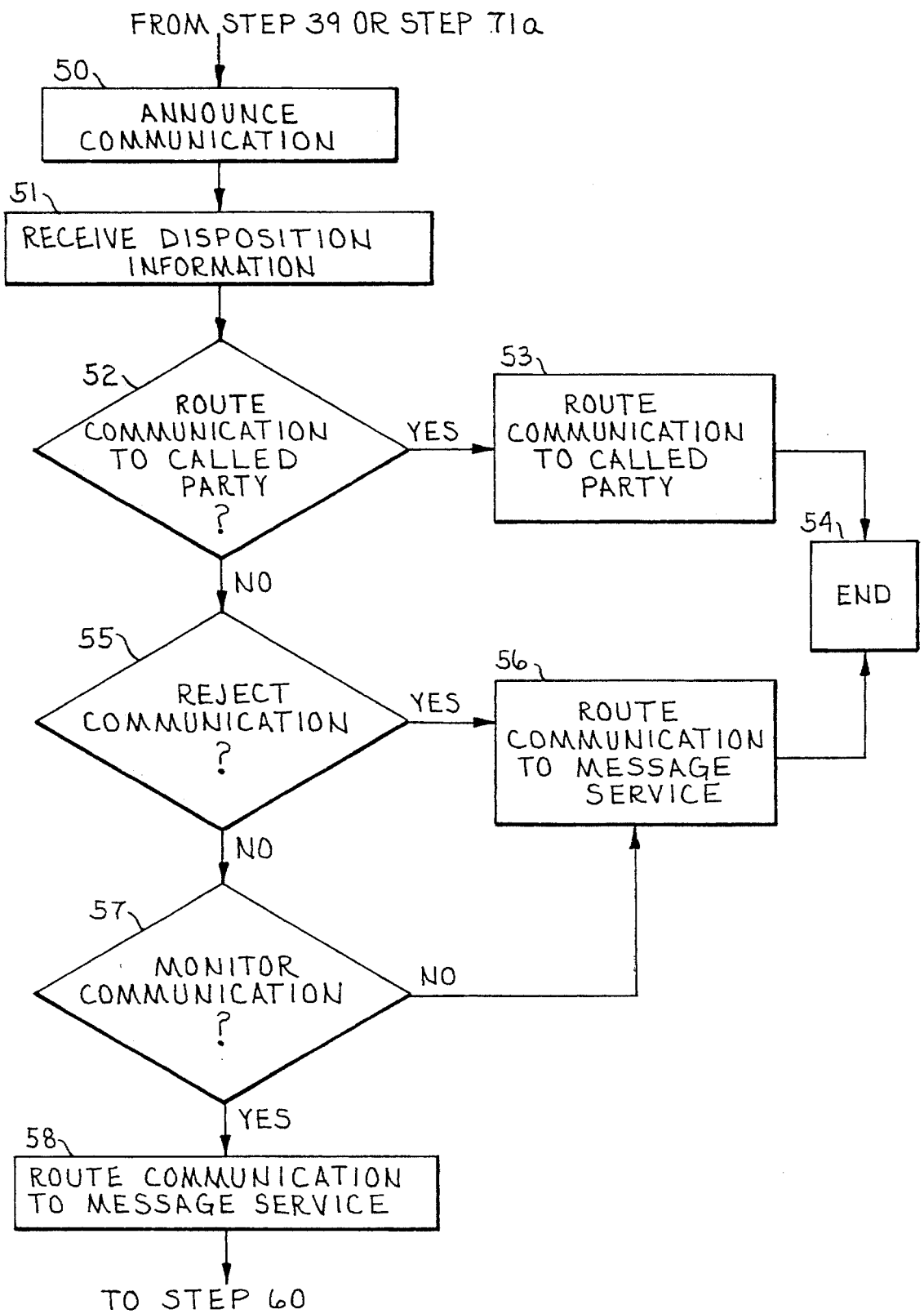

Referring again to step 39 of FIG. 3A, if the call has been answered by the called party within the first predetermined amount of time, in step 50 of FIG. 3C the present invention announces the receipt of a communication to the called party. As part of the announcement, the preferred embodiment may also provide some identification of the source of the communication such as the calling line identification number and/or the name associated with the line. This information is provided by switching point 14 to service node 16. The preferred embodiment requests the called party for disposition information as to the communication. In particular, the preferred embodiment instructs the called party to: press a preselected number on the touch-tone telephone used by the called party to indicate an acceptance of the communication; press a different preselected number to indicate a rejection of the communication; and press yet another preselected number to indicate a request to monitor the communication.

In step 51, the present invention receives the disposition information from the called party. In step 52, the present invention checks whether it has received an indication of an acceptance to route the communication to the called party. If so, in step 53 the communication is routed to the called party, and the present invention proceeds to end in step 54. The communication is treated as a conventional communication made directly to the called party. If the communication is not to be routed to the called party, then in step 55 the present invention checks whether it has received an indication of a rejection. If so, in step 56 the communication is routed to the message service, and the present invention proceeds to end in step 54. If there has been no indication of rejection, in step 57 the present invention checks whether it has received an indication of a request to monitor the communication. If no request to monitor has been received, the communication is routed to the message service in step 56, and the present invention proceeds to end in step 54. If a request to monitor the communication has been received, in step 58 the present invention routes the communication to the message service.

In step 60 of FIG. 3D, a one-way connection from the communication to the called party is established. As noted above, the one-way connection allows the called party to monitor the communication without the calling party being aware of the monitoring. In the case of a telephone call, the called party is able to hear the message of the calling party as the calling party is leaving the message.

As noted above, if a called party monitoring a communication does not desire to further monitor the communication, the called party then has two options: (1) have the communication connected to the called party; or (2) discontinue monitoring. In step 61, the present invention checks whether it has received an indication to connect the communication to the called party. This option is most likely to be exercised when the called party is using the present invention as a screening device, and based upon the screening, the called party decides to communicate with the calling party. If the communication is to be connected to the called party, in step 62 the present invention establishes a two-way connection between the communication and the called party. The communication is treated as an ordinary communication between the calling and called party. In addition, as part of step 62, the present invention provides for the discontinuation of the recording of the communication and erasure of the message service record of the communication interrupted by the two-way connection of the communication to the called party. The present invention proceeds to end in step 63.

If no indication to connect the communication is received, in step 64 the present invention checks whether it has received an indication to discontinue monitoring. If so, the present invention discontinues the one-way connection from the communication to the called party in step 65. However, the message service preferably continues to record the communication. The present invention then proceeds to end in step 63. This option is most likely to be exercised by a called party who chooses to monitor just enough of a communication to get the necessary information, and then turns his/her attention to other matters.

If the present invention does not receive an indication to discontinue monitoring, in step 66 the present invention checks whether the called party has disconnected. Such a disconnection may occur when the called party hangs up the telephone receiver instead of pressing a preselected number on a touch-tone telephone to discontinue monitoring the communication. If the called party has disconnected, in step 65 the present invention discontinues the one-way communication. However, the message service preferably continues to record the communication. The present invention then proceeds to end in step 63.

If the called party has not disconnected, in step 67 the present invention checks whether the communication has been disconnected. Such a disconnection may occur when the calling party hangs up prior to leaving a message or when the calling party completes the message. If the communication is disconnected, in step 68 the present invention informs the called party of the disconnection. The preferred embodiment may also provide some identification of the source of the communication such as a calling line identification number or the name associated with the calling line to the called party. In step 69, the present invention discontinues the one-way connection and proceeds to end in step 63. If the communication has not been disconnected, the present invention returns to step 61 and continues to repeat the checks of steps 61, 64, 66 and 67 until one of the checks results in the present invention proceeding to end in step 63.

Figure 3E:
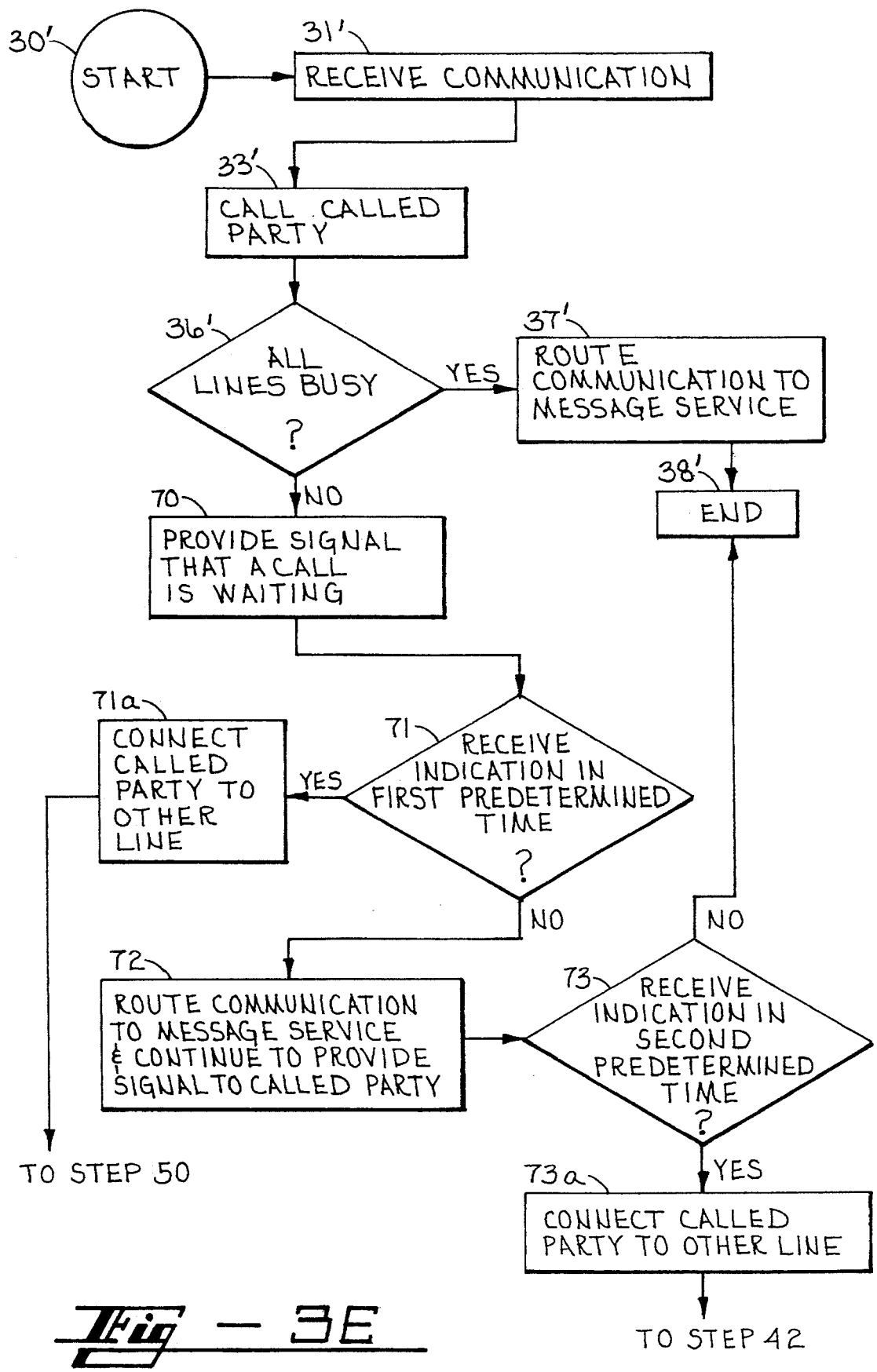

As noted above, the present invention is useful in connection with a communication directed to a location having simultaneous call capability on the same telephone number such as a call waiting service. The present invention operates generally in the same manner as described above in connection with a simultaneous call capability service except with respect to steps that are necessary to work with the service and that are well known to those skilled in the art. FIG. 3E illustrates a method of processing a communication pursuant to a preferred embodiment of the present invention when a telephone number has a simultaneous call capability service. In FIG. 3E, a prime reference number (such as "30") is used to indicate that the referenced step is generally same as a step in FIG. 3A.

FIG. 3E is entered at step 30', and in step 31', the present invention receives the communication. In step 33', the present invention calls the called party having a telephone number with a simultaneous call capability service. In step 34, the present invention checks whether all lines associated with the telephone number are busy. If so, in step 37', the communication is routed to the internal or external message service, and the present invention proceeds to end in step 38'. If all lines associated with the telephone number are not busy, then in step 70, in a well known manner, a signal is provided to the called party that a call is waiting on another calling line. The called party may decide to be connected to the other (second) calling line, and, also in a well known manner, provide an indication of such decision. In step 71, in a well known manner, the present invention checks whether an indication has been received to connect the call within a first predetermined time, such as two call waiting tones. If so, in step 71a the present invention connects the called party to the other (second) calling line, and then the invention proceeds to step 50, FIG. 3C. Once the called party is connected to the second calling line, the present invention operates in the same manner as if the called party did not have simultaneous call capability services. If no indication has been received, in step 72, the present invention routes the communication to the message service and continues to provide a signal to the called party. In step 73, the present invention checks whether an indication has been received to connect the call within a second predetermined time, such as an additional call waiting tone. If the call has not been answered during this latter interval, the present invention proceeds to end in step 38. If the call has been answered, in step 73a the present invention connects the called party to the other (second) calling line, and then the invention proceeds to step 42, FIG. 3B. Once the called party is connected to the second calling line, the present invention operates in the same manner as if the called party did not have simultaneous call capability services.

While this invention has been described in detail with particular reference to the preferred embodiments thereof, it will be understood that variations and modifications can be effected within the spirit and scope of the invention as described hereinabove and as defined in the appended claims.

We claim:

1. A method for processing a communication directed to a called party, comprising the steps of:

receiving said communication;

advising said called party of said communication;

receiving disposition information regarding said communication, said disposition information comprising a request for monitoring said communication;

in response to receiving said request for monitoring, routing said communication to a message service and establishing a one-way connection from said communication to said called party, whereby said communication routed to said message service may be monitored by said called party through said one-way connection.

2. The method of claim 1, further comprising the step of determining the location of said called party in response to said step of receiving said communication.

3. The method of claim 2, wherein said step of determining said location of said called party comprises determining said location from a list, said list including at least one location provided by said called party.

4. The method of claim 1, further comprising the step of requesting said disposition information from said called party after said step of receiving said communication.

5. The method of claim 1, wherein said disposition information further comprises an indication to disconnect said called party from said communication, said method further comprising the steps of:

after said step of establishing said one-way connection, receiving said indication to disconnect; and in response to receiving said indication to disconnect, discontinuing said one-way connection.

6. The method of claim 1, wherein said disposition information further comprises an indication to connect said communication, said method further comprising the steps of:

after said step of establishing said one-way connection, receiving said indication to connect said communication to said called party; and in response to receiving said indication to connect, discontinuing said one-way connection and establishing a two-way connection between said communication and said called party.

7. The method of claim 1, further comprising the step of recording said communication.

8. The method of claim 7, further comprising the steps of:

after said step of establishing said one-way connection, receiving an indication from said called party to connect said communication to said called party;

discontinuing said one-way connection and establishing a two-way connection between said communication and said called party in response to said indication to connect;

discontinuing said recording of said communication in response to said indication to connect; and after said step of discontinuing said recording, erasing the recorded communication.

9. The method of claim 1, wherein said disposition information further comprises an indication to accept said communication, and said method further comprises establishing a two-way connection between said communication and said called party in response to said step of receiving said indication to accept said communication.

10. The method of claim 1, wherein said disposition information further comprises as indication to reject said communication, and said method further comprises routing said communication to said message service in response to said step of receiving said indication to reject said communication.

11. A method for processing a communication directed to a called party having a first calling line and a second calling line, said called party being connected to a second party through said first calling line, comprising the steps of:

receiving said communication;

calling said called party on said second calling line;

receiving an indication from said called party to connect said called party to said second calling line;

in response to receiving said indication to connect, connecting said called party to said second calling line and advising said called party of said communication;

receiving disposition information regarding said communication, said disposition information comprising a request for monitoring said communication;

in response to receiving said request for monitoring, routing said communication to a message service and establishing a one-way connection from said communication to said called party, whereby said communication routed to said message service may be monitored by said called party through said one-way connection.

12. The method of claim 11, wherein said step of establishing said one-way connection comprises establishing a one-way connection from said communication to said called party on said second calling line.

13. The method of claim 11, wherein said disposition information further comprises an indication to disconnect said called party from said communication, said method further comprising the steps of:

after said step of establishing said one-way connection, receiving said indication to disconnect; and in response to receiving said indication to disconnect, discontinuing said one-way connection.

14. The method of claim 11, wherein said disposition information further comprises an indication to connect said communication, said method further comprising the steps of:

after said step of establishing said one-way connection, receiving said indication to connect said communication to said called party;

in response to receiving said indication to connect, discontinuing said one-way connection and establishing a two-way connection between said communication and said called party on said second calling line.

15. The method of claim 11, further comprising the step of recording said communication.

16. The method of claim 15, further comprising the steps of:

after said step of establishing said one-way connection, receiving an indication from said called party to connect said communication to said called party;

discontinuing said one-way connection and establishing a two-way connection between said communication and said called party on said second calling line in response to said indication to connect;

discontinuing said recording of said communication in response to said indication to connect; and after said step of discontinuing said recording, erasing the recorded communication.

17. A method for processing a communication directed to a called party, comprising the steps of:

receiving said communication;

determining the location of said called party;

calling said called party at said location in response to said step of receiving said communication;

receiving an indication that said called party has answered:

requesting disposition information from said called party, said disposition information comprising an acceptance of said communication, a rejection of said communication, and a request for monitoring said communication;

in response to receiving said acceptance of said communication, establishing a two-way connection between said communication and said called party;

in response to receiving said rejection of said communication, routing said communication to a message service; and in response to receiving said request for monitoring said communication, routing said communication to said message service and establishing a one-way connection from said communication to said called party, whereby said called party may monitor said communication.

18. The method of claim 17, wherein said step of determining said location comprises accessing a list, said list including at least one location provided by said called party.

19. The method of claim 17, further comprising the steps of:

after said step of establishing said one-way connection, receiving an indication from said called party to discontinue said one-way connection; and in response to receiving said indication to discontinue, discontinuing said one-way connection.

20. The method of claim 17, further comprising the steps of:

after said step of establishing said one-way connection, receiving an indication from said called party to connect said communication to said called party; and in response to said indication, disconnecting said one-way connection and establishing a two-way connection between said communication and said called party.

21. An apparatus for allowing a called party to selectively monitor a communication comprising:

means for receiving said communication directed to said called party;

means for determining the location of said called party;

means for calling said called party at said location in response to receiving said communication;

means for requesting disposition information from said called party, said disposition information comprising a request for monitoring said communication; and means for routing said communication to a message service and for establishing a one-way connection from said communication to said called party in response to receiving said request for monitoring said communication.

22. The apparatus as in claim 21, wherein said determining means determines said location of said called party from a list, said list including at least one location provided by said called party.

23. The apparatus as in claim 21, wherein said disposition information further comprises a request from said called party to discontinue said one-way connection and said means for routing discontinues said one-way connection in response to said request to discontinue.

24. The apparatus as in claim 21, wherein said message service comprises means for recording said communication.

25. A method for a called party to respond to an incoming communication, comprising the steps of:

responding to an indication that said communication has been received, said communication being directed to said calling party:

receiving an announcement of said communication;

making a decision whether to accept said communication or to reject said communication;

providing disposition information, said disposition information comprising an acceptance of said communication and a request for monitoring of said communication;

if said decision is to accept said communication, then providing said disposition information indicating an acceptance and then receiving said communication;

if said decision is to request monitoring of said communication, then providing disposition information indicating that said communication is to be routed to a message service and that a one-way connection from said communication to said called party is to be established, and then monitoring said communication through said one-way connection from said communication.

26. The method of claim 25, further comprising the steps of:

making a decision to discontinue monitoring said communication;

providing an indication to discontinue said one-way connection; and discontinuing said monitoring of said communication.

27. The method of claim 25 further comprising the steps of:

after an interval of monitoring said communication, making a decision to accept said communication;

providing an indication to accept said communication; and receiving said communication.

28. A method for a called party to selectively monitor an incoming communication, said called party having a first calling line and a second calling line, said called party being connected to a second party through said first calling line, comprising the steps of:

receiving a notice of said communication on said second calling line;

providing an indication to be connected to said second calling line;

after connection to said second calling line, receiving an announcement of said communication on said second calling line;

making a decision whether to monitor said communication; and if said decision is to monitor said communication, then providing a request to monitor said communication on said second calling line and monitoring said communication through a one-way connection from said communication on said second calling line.

29. The method of claim 28, further comprising the steps of:

making a decision to discontinue monitoring said communication;

providing an indication to discontinue said one-way connection; and discontinuing said monitoring of said communication.

30. The method of claim 28, further comprising the steps of:

after an interval of monitoring said communication, making a decision to accept said communication;

providing an indication to receive said communication; and receiving said communication.

31. In a public switched telephone network, a communications monitoring system for allowing a called party to selectively monitor a communication from a calling party, comprising in combination:

a switching point operative to provide an identification number of said communication;

a database functionally connected to said switching point and responsive to said identification number to provide handling instructions to said switching point; and a service node functionally connected to said switching point;

whereby said switching point is responsive to said handling instructions to provide said communication to said service node, said service node is responsive to said communication to request call information from said database, said call information comprising a registered location of said called party;

in response to said service node receiving said call information from said database, said service node calls said called party, requests disposition information from said called party, and receives said disposition information, said disposition information comprising a request to monitor said communication;

in response to said service node receiving said request to monitor, said service node routes said communication to a message service and establishes a one-way connection from said communication to said called party so that said communication routed to said message service may be monitored by said called party through said one-way connection.

32. The system of claim 31, wherein said disposition information further comprises a request from said called party to discontinue monitoring, and wherein said service node is responsive to said request to discontinue monitoring by discontinuing said one-way connection.

* * * * *